United States Patent [19]

Plate

[11] Patent Number: 5,230,399

[45] Date of Patent: Jul. 27, 1993

[54] FOUR-WHEEL STEERING SYSTEM FOR VEHICLES

[75] Inventor: John R. Plate, Milwaukee, Wis.

[73] Assignee: Trak International, Inc., Port Washington, Wis.

[21] Appl. No.: 795,693

[22] Filed: Nov. 21, 1991

[51] Int. Cl.⁵ ............................................. B62D 5/08
[52] U.S. Cl. .................................. 180/140; 180/141; 180/142
[58] Field of Search ................ 180/140, 142, 143, 141

[56] References Cited

U.S. PATENT DOCUMENTS

| | | | |
|---|---|---|---|
| 3,185,245 | 5/1965 | Hoyt . | |
| 3,227,238 | 1/1966 | Strader | 180/140 |
| 3,556,243 | 1/1971 | Susag et al. | 180/140 |
| 3,604,528 | 9/1971 | Williamson | 180/140 |
| 3,724,585 | 4/1973 | Conrad | 180/140 |
| 3,750,834 | 8/1973 | Luft . | |
| 4,175,638 | 11/1979 | Christensen | 180/140 |
| 4,394,886 | 7/1983 | Rathj et al. | 180/140 |
| 4,398,616 | 8/1983 | Braden et al. | 180/140 |
| 4,457,389 | 7/1984 | Voelz | 180/140 |
| 4,679,336 | 7/1987 | Brocklebank et al. | 37/103 |
| 4,767,256 | 8/1988 | Knight | 414/708 |
| 4,773,814 | 9/1988 | Brocklebank et al. | 414/695.5 |
| 4,917,204 | 4/1990 | Andrew et al. | 180/140 |

FOREIGN PATENT DOCUMENTS 2204014 11/1988 United Kingdom .

OTHER PUBLICATIONS

Steering Valve Product Brochure.

*Primary Examiner*—Mitchell J. Hill
*Attorney, Agent, or Firm*—Michael, Best & Friedrich

[57] ABSTRACT

A vehicle having at least four wheels comprising a pair of front wheels and a pair of rear wheels, first and second reversible hydraulic cylinders coupled respectively to the front wheels for turning the same and third and fourth hydraulic cylinders coupled respectively to the rear wheels for turning the same, a hydraulic pressure source, a hydraulic circuit for selectively coupling each of the cylinders to the hydraulic pressure source for simultaneously turning the front and rear wheels whereby the vehicle may be turned in either a right-hand or a left-hand direction. The hydraulic circuit includes a flow controller in circuit between the pressure source and the hydraulic cylinders for bypassing hydraulic fluid around one pair of hydraulic cylinders when that pair of cylinders orients its wheels in a forward direction during a transition from a turn in one direction to a turn in the opposite direction until the other pair of wheels are also oriented in a forward direction, the flow controller being operative to return fluid flow to the one pair of cylinders when both the front and rear wheels are oriented forwardly for continued transitional movement of all wheels to a turn in the opposite direction.

12 Claims, 3 Drawing Sheets

5,230,399

FOUR-WHEEL STEERING SYSTEM FOR VEHICLES

BACKGROUND OF THE INVENTION

This invention relates to vehicles and more particularly to a four-wheel steering system for vehicles.

Relatively large vehicles, employed for example as prime movers, tractors, utility vehicles, and material handlers, are often equipped with four-wheel steering to facilitate maneuvering in relatively confined areas. Such four-wheel systems often include a dual-acting hydraulic cylinder coupled to each wheel through a linkage wherein each wheel may be pivoted through a limited angle in either direction. In one type of four-wheel steering system, the two front wheel cylinders are connected in parallel to each other and the rear wheel cylinders are similarly connected. In addition, the parallel combination of front wheel cylinders are connected in series with the parallel combination of rear wheel cylinders. In such series-parallel systems, either the pair of front or rear wheel cylinders receives pressurized hydraulic fluid directly from the pressure source, while the other pair receives slave fluid expelled from the opposite ends of the directly connected cylinders. As a result of leakage, the directly connected cylinders receive more hydraulic fluid than the second pair of cylinders. When such four-wheel steering systems are in transition from steering in one direction to steering in an opposite direction, both the front and rear wheels will be moved through a forward or neutral orientation before they become oriented in the opposite direction. However, because the directly connected turning cylinders receive more hydraulic fluid than the slave-connected cylinders, one pair of wheels will reach a neutral or center orientation prior to the other set. This may result in a transitional situation wherein the front and rear wheels are temporarily oriented in opposite directions.

SUMMARY OF THE INVENTION

It is an object of the invention to provide a new and improved four-wheel steering system for vehicles.

A further object of the invention is to provide a four-wheel vehicle steering system wherein the wheels are coordinated during transitional turning from one direction to the other.

Another object of the invention is to provide a four-wheel steering system wherein the wheels are prevented from transitioning through a forward orientation during a turn in one direction to a turn in the opposite direction until both front and rear wheels are forward oriented.

These and other objects and advantages of the present invention will become more apparent from the detailed description thereof taken with the accompanying drawings.

According to one aspect, the invention comprises a vehicle having at least four wheels comprising a pair of front wheels and a pair of rear wheels, a reversible hydraulic cylinder means coupled to each wheel for turning the same and comprising a first pair coupled respectively to the front wheels and a second pair coupled respectively to the rear wheels, a hydraulic pressure source, hydraulic means for selectively coupling each of the hydraulic cylinder means to the hydraulic pressure source for simultaneously turning the front and rear wheels whereby the vehicle may be turned in either a right-hand or a left-hand direction, and flow control means in circuit between the pressure source and the hydraulic cylinder means for bypassing hydraulic fluid around one pair of hydraulic cylinders when that pair of cylinders orients its wheels in a forward direction during a transition from a turn in one direction to a turn in the opposite direction until the other pair of wheels are also oriented in a forward direction, the flow control means being operative to return fluid flow to the one pair of cylinders when both pair of wheels are oriented forwardly for continued transitional movement of all wheels to a turn in the opposite direction.

DETAILED DESCRIPTION OF THE PREFERRED EMBODIMENT

Figure 1:
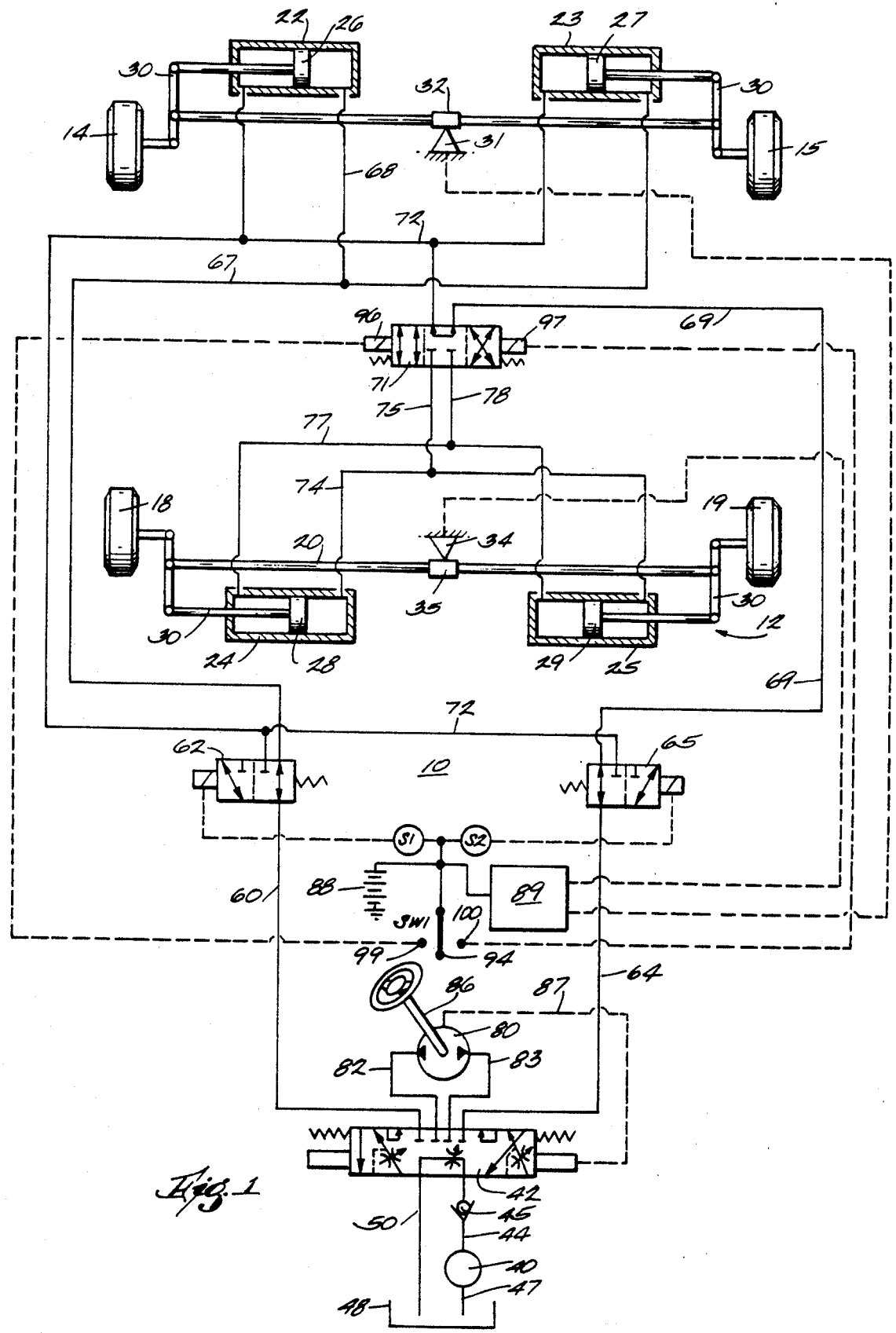
FIG. 1 schematically illustrates the four-wheel steering system according to the preferred embodiment of the invention.

FIG. 1 illustrates a steering system 10 for a vehicle 12 having a pair of front wheels 14 and 15 and a pair of rear wheels 18 and 19 mounted for rotation on the vehicle frame (not shown). Each of the front wheels 14 and 15 may be pivoted for steering by steering actuators which, in the illustrated embodiment, comprise double-acting cylinders 22 and 23, respectively. Similarly, each of the rear wheels 18 and 19 may be pivoted for steering by steering actuators or double-acting cylinders 24 and 25, respectively. Those skilled in the art will appreciate that each of the cylinders 22, 23, 24 and 25 has a double-acting piston 26, 27, 28 and 29, respectively, each of which is coupled to its respective wheel by a suitable steering linkage 30.

A proximity switch 31 is mounted adjacent the front of the vehicle frame and is responsive to the position of an element 32 coupled to each of the front steering linkages 30 whereby proximity switch 31 is actuated when the linkages 30 are oriented such that each of the front wheels 14 and 15 is in a dead-center forward orientation relative to the vehicle 12. A second proximity switch 34 is mounted adjacent the rear of the vehicle frame and is responsive to an element 35 coupled to each of the rear steering linkages 30 whereby proximity switch 34 will be actuated when the linkages are oriented such that each of the rear wheels 18 and 19 is in a dead-center forward orientation relative to the vehicle 12.

The steering system 10 includes a pump 40 having an outlet connected to a first port of a steering valve 42 through a conduit 44 and a check valve 45. The inlet of pump 40 is connected by conduit 47 to a sump 48. The sump 48 is also connected by conduit 50 to a second port of steering valve 42.

A third port of steering valve 42 is connected by conduit 60 to a first port of a first solenoid-operated makeup oil valve 62 and a fourth port of steering valve 42 is connected by conduit 64 to a first port of a second solenoid-operated makeup oil valve 65. A second port of valve 62 is connected by conduits 67 and 68 to cylinder 22 on the piston side and by conduit 67 to cylinder 23 on the linkage side. A second port of valve 65 is connected by conduit 69 to a first port of a steering select valve 71. A conduit 72 is connected to a second port of steering select valve 71, to third ports of each of the valves 62 and 65 and to the cylinders 22 and 23 on the opposite sides of their respective pistons 26 and 27. The piston end of rear steering cylinder 24 and the linkage end of rear steering cylinder 25 are connected by conduits 74 and 75 to a third port of steering select valve 71 and the other ends of cylinders 24 and 25 are connected by conduits 77 and 78 to a fourth port of steering select valve 71.

Steering valve 42 is a three-position, servo valve which is spring centered. When valve 42 is centered, all of the outlet ports are blocked so that no hydraulic fluid flows to the steering cylinders 22, 23, 24 and 25 and the pump 40 is coupled directly to sump 48 as illustrated in FIG. 1.

The steering assembly 10 also includes a metering unit or gerotor pump 80 coupled by conduits 82 and 83 to fifth and sixth outlet ports of steering valve 42 and by a link 87 to the operator of the valve 42. Metering unit 80 is coupled to the vehicle steering wheel 86 and when rotated will meter hydraulic liquid at a rate dependent upon the velocity at which it is rotated. In addition, steering wheel 86 is mechanically coupled by a link 87 to valve 42 so that clockwise rotation of steering unit 80 from a neutral orientation will cause the steering valve 42 to be moved from its center position to the right and counterclockwise rotation of steering control valve 80 will cause steering valve 42 to be moved to the left.

Each of the solenoid-operated oil makeup valves 62 and 65 is a two-position, three-way valve whose solenoids are respectively connected through switches S1 and S2 to a power supply 88. Switches S1 and S2 are operated by a control 89 which is electrically coupled to receive signals from the proximity switches 31 and 34.

Steering select valve 71 is a solenoid operated, three-position, four-way valve which is spring-operated to its neutral position. When valve 71 is in its neutral position, conduit 69 is connected to conduit 72 for two-wheel steering by means of the front wheels 14 and 15 with the rear cylinders 24 and 25 being disconnected from the hydraulic system. When moved to the right, valve 71 is in its four-wheel mode with conduits 69 and 72 being connected to conduits 77 and 74, respectively. In four-wheel steering, the front and rear wheels are oriented in opposition directions. Movement of valve 71 to the left connects conduit 69 to conduit 74 and conduit 72 to conduit 77 for crab steering, which is a steering mode wherein the front and rear wheels are turned in the same direction. A three-pole switch SW1 is selectively operable for actuating the valve 71 for two-wheel, four-wheel or crab steering. For two-wheel steering, switch SW1 is set on contact 94 wherein solenoids 96 and 97 of valve 71 are de-energized and the valve is in a neutral position. If switch SW1 is moved to contact 99 to energize solenoid 96, valve 71 is moved to the right to effect four-wheel steering, while movement of switch SW1 to contact 100 will energize solenoid 97 to move valve 71 to the left to effect crab steering.

FIG. 1 shows the steering system 10 with the steering control valve 80 in a neutral position, wherein the pump 40 is connected through steering valve 42 to the sump 48 and the wheels 14, 15, 18 and 19 oriented forwardly. If it is desired to turn to the right, the steering control valve 80 is rotated clockwise, thereby moving the steering valve 42 to the right. This connects the pump outlet to conduit 64 through conduits 82, 83 and steering control valve 80 and sump 48 is connected to conduit 60. If the steering select valve 71 is set for two-wheel steering, pressurized fluid is delivered from pump 40 through conduit 64, makeup oil valve 65, and steering select valve 71 to conduit 72. This will turn wheels 14 and 15 to the right. Fluid expelled from the opposite ends of cylinders 22 and 23 is returned to the sump through conduits 68, 67, 60 and 50 and makeup oil valve 62.

If a left turn is desired from the neutral mode shown in FIG. 1, the steering control valve 80 is rotated counter-clockwise, thereby moving the steering valve 42 to the left to connect the pump outlet to conduit 83 and the sump to conduit 64. If the steering select valve 71 is set for two-wheel drive, pressurized fluid is delivered to cylinders 22 and 23 from conduit 83 through steering control valve 80 to conduit 82, steering valve 42, conduit 60, makeup oil valve 62 and conduit 67. This turns wheels 14 and 15 toward the right. Fluid expelled from the opposite ends of cylinders 22 and 23 returns to the sump through conduits 72, 64 and valve 65.

If switch SW1 is set on contact 99 for four-wheel steering, and steering valve 42 moved to a position for a right turn, pressurized fluid is delivered through conduits 64, 69, steering select valve 71 and conduits 77 and 78 to the rod end of cylinder 24 and the piston end of cylinder 25 so that rear wheels 18 and 19 turn toward the left. Fluid from the opposite ends of cylinders 24 and 25 is delivered through conduits 74 and 75, steering select valve 71 and conduit 72 to the rod end of cylinder 22 and the piston end of cylinder 23 so that the front wheels 14 and 15 turn toward the right. This will result in a turn to the right. Oil exiting cylinders 22 and 23 returns to the sump through conduits 68, 67, 60 and 50.

Figure 2:
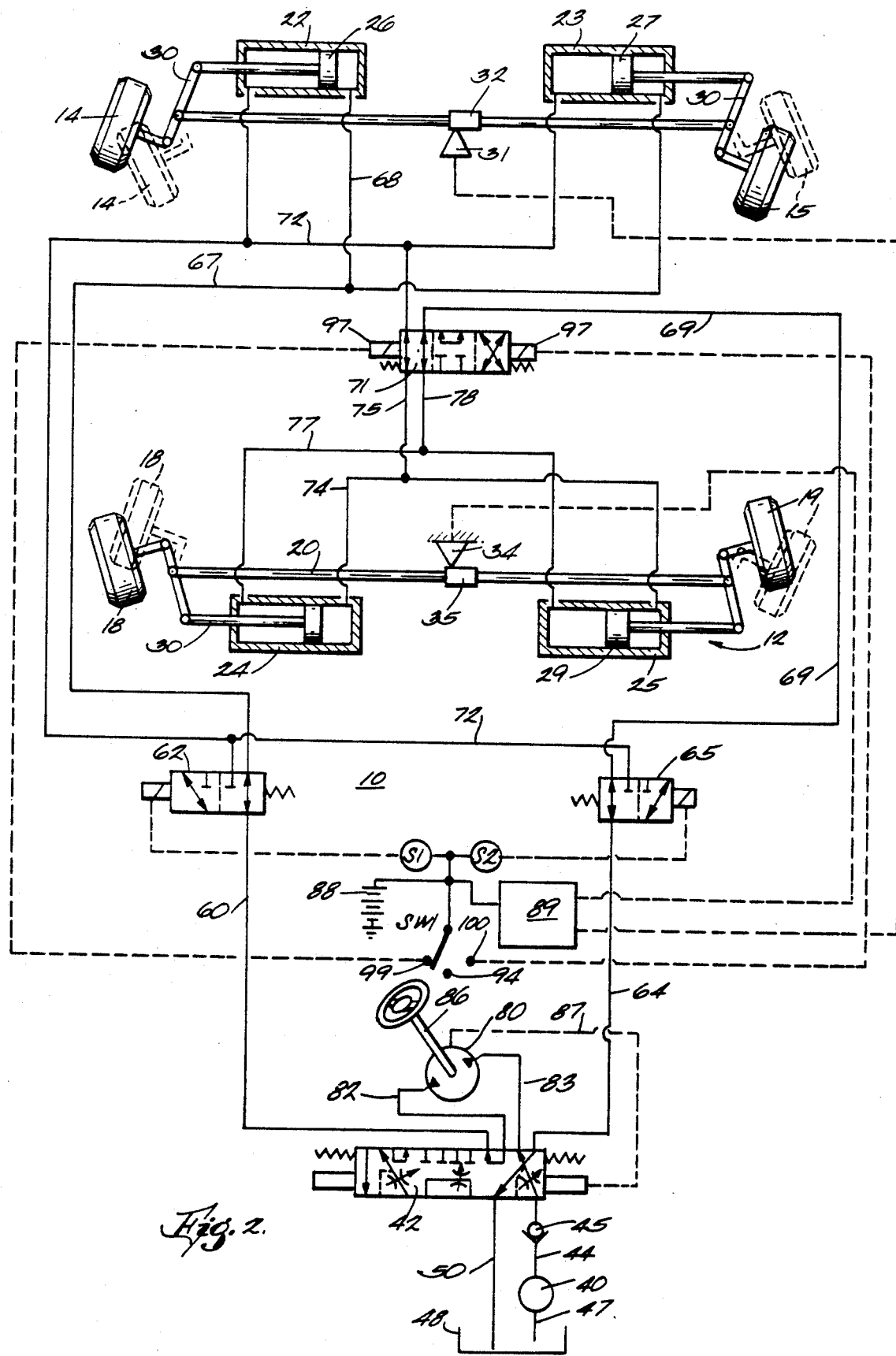
FIG. 2 shows the steering system of FIG. 1 in an alternate mode.

Should the operator desire to turn left out of a right turn while in four-wheel steering, the steering control valve 80 is turned counter-clockwise so that the steering valve 42 is moved to the left to its position shown in FIG. 2. This connects the pump outlet to conduit 83 and the sump 48 to conduit 64. As a result, pressurized hydraulic fluid is delivered to the piston side of cylinder 22 and the rod side of cylinder 23 through valve 80, conduits 83, 82 and 60, valve 62 and conduits 67 and 68. Fluid expelled from the opposite sides of cylinders 22 and 23 is delivered to piston side of cylinder 24 and the rod side of cylinder 25 through conduit 72, valve 71 and conduit 74. The return flow of liquid from cylinders 24 and 25 is through conduit 77, valve 71, conduit 69, valve 65 and conduit 64. This will cause the wheels 14 and 15 to turn toward the left and wheels 18 and 19 to turn toward the right.

When the system 10 is in transition to a left turn from a right turn as shown in FIG. 2, pressurized hydraulic fluid is delivered directly to cylinders 22 and 23 while slave fluid expended from the opposite ends of these cylinders is delivered to cylinders 24 and 25. Because of leakage, the quantity of hydraulic fluid delivered to cylinders 22 and 23 will be greater than the slave fluid delivered to cylinders 24 and 25. Therefore, the front wheels 14 and 15 will turn at a somewhat faster rate and will thus arrive at a neutral or forward orientation while the rear wheels are still turned to the left. In order to prevent the front wheels 14 and 15 from moving through a neutral position into a left turn orientation while the rear wheels are still oriented for a right turn, proximity switches 31 and 34 and solenoid-operated makeup oil valves 62 and 65 are provided. As the front wheels 14 and 15 assume their neutral orientation, element 32 moves into position adjacent proximity switch 31 which will operate to signal control 89 to close contacts S1 so that solenoid 102 of valve 62 is energized to move valve 62 to its alternate position. This connects conduit 60 to conduit 72, thereby connecting cylinders 24 and 25 directly to the source of pressurized hydraulic liquid and bypassing cylinders 22 and 23. As a result, the front wheels 14 and 15 remain oriented forwardly, while the rear wheels continue to pivot. As the rear wheels move into their neutral orientation, element 35 will actuate proximity switch 34 to provide a signal to control 89 so that makeup oil valve 62 is deactivated. When valve 62 returns to its position shown in FIG. 2, the front wheel cylinders 22 and 23 are reconnected so that they can resume turning to the left.

Figure 3:
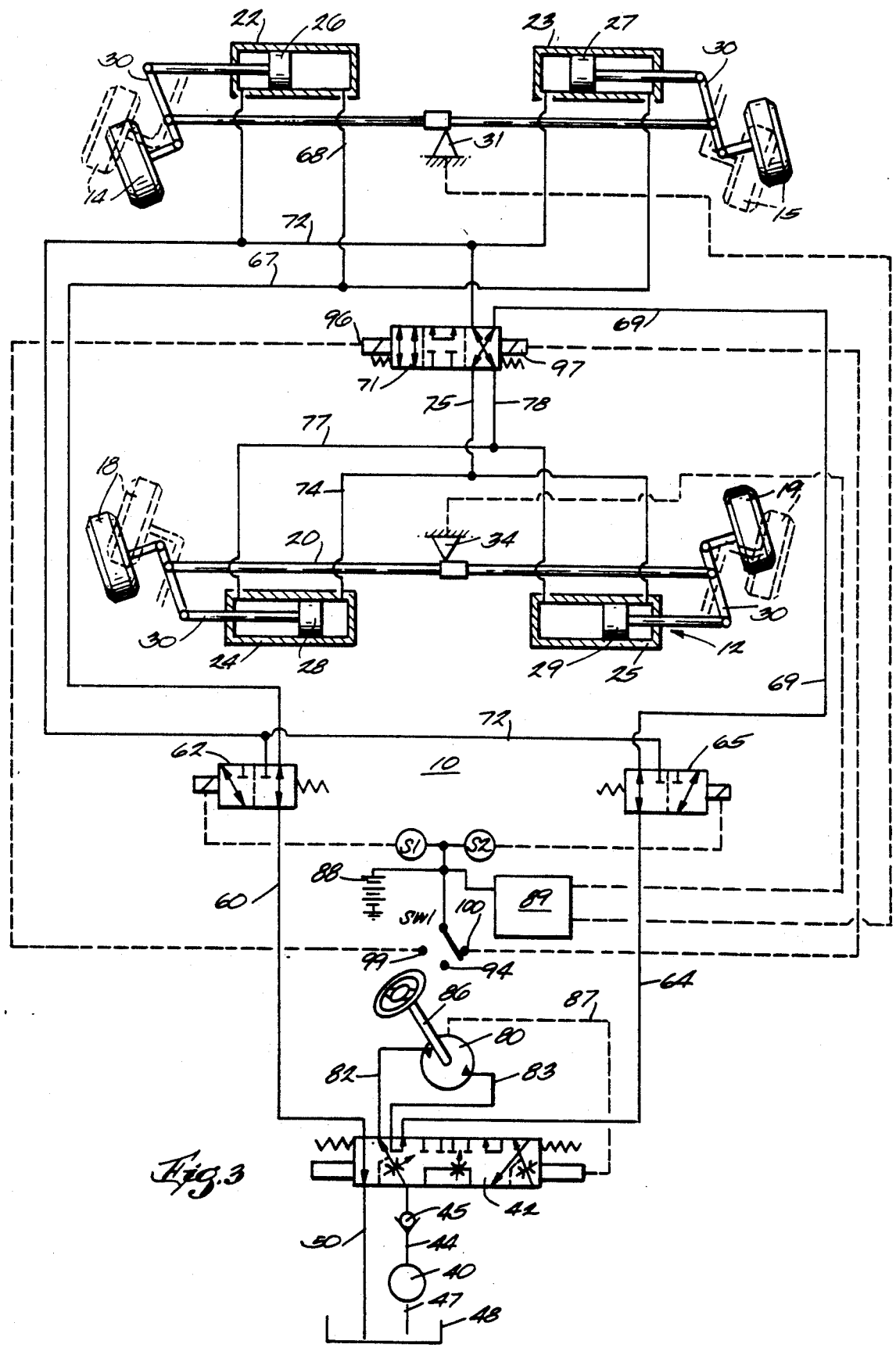
FIG. 3 shows the steering system of FIG. 1 in an alternate mode.

Assume, for purposes of illustration, that switch SW1 is set on contact 100 for crab steering and valve 42 is set for a left turn as shown in FIG. 3. In this mode, pressurized fluid is delivered to cylinders 22 and 23 from conduits 60 and 67 and slave fluid is delivered from the rod side of cylinder 22 and the piston side of cylinder 23 through conduit 72, valve 71 and conduits 77 and 78 to the rod side of cylinder 24 and the piston side of cylinder 25. Return fluid from cylinders 24 and 25 flows through conduit 74, valve 71, conduits 69, 64 and valves 42 and 65.

Should the operator desire to turn right out of a left turn, the steering control valve 80 is turned clockwise so that the steering valve 42 is moved to the right to its position shown in FIG. 3. This connects the pump outlet to conduit 64 and the sump 48 to conduit 60. As a result, pressurized fluid is delivered to the piston end of cylinder 24 and the rod end of cylinder 25 through valve 65, conduits 69, 75 and 74. Slave fluid expelled from the opposite sides of cylinders 24 and 25 is delivered to the rod end of cylinder 22 and the piston end of cylinder 23 through conduit 74, valve 71 and conduit 72. The return flow of liquid is through conduit 67 and 68, valve 62, conduit 60, valve 42 and conduit 50. It can be seen that pressurized hydraulic liquid is delivered directly to cylinders 24 and 25 while slave fluid expelled from the opposite ends of these cylinders is delivered to cylinders 22 and 23. As a result of leakage, the quantity of hydraulic fluid delivered to cylinders 24 and 25 will be somewhat greater than the slave fluid delivered to cylinders 22 and 23. For this reason, the rear wheels 18 and 19 pivot faster than the front wheels 14 and 15 so that the rear wheels move into a neutral or forward orientation while the front wheels are still turned toward the left. As the rear wheels 18 and 19 assume their neutral orientation, element 35 moves into position adjacent proximity switch 34 which then signals control 89 to actuate switch S2. This operates the makeup oil valve 65 to its alternate position. As a result, conduit 64 is connected to conduit 72, thereby connecting cylinders 22 and 23 directly to the source of pressurized hydraulic liquid. Fluid from the other side of cylinders 22 and 23 is returned to sump 48 through conduits 67 and 60 and valve 62, thereby bypassing cylinders 24 and 25. As the front wheels move into their neutral orientation, element 35 actuates proximity switch 34, which signals control 89 to deactivate makeup oil valve 65 and the system returns to its right turn mode shown in FIG. 3.

It can be seen that the steering system according to the invention insures that during a turning procedure, one pair of wheels will not transition from a turn in one direction to a turn in the opposite direction until both front and rear wheels are oriented forwardly.

While only a single embodiment of the invention has been illustrated and described, it is not intended to be limited thereby, but only by the scope of the appended claims.

I claim:

1. A vehicle comprising a pair of front wheels, a pair of rear wheels, reversible hydraulic cylinder means coupled to each wheel for providing steering movement of the wheels and including a first pair of hydraulic cylinder means coupled respectively to the front wheels and a second pair of hydraulic cylinder means coupled respectively to the rear wheels, a hydraulic pressure source, valve means for selectively coupling each of said cylinder means to the hydraulic pressure source for simultaneously causing steering movement of the front and rear wheels whereby the vehicle may be turned in either a right-hand or a left-hand direction and flow control means between said pressure source and said cylinder means for bypassing hydraulic fluid around one of said first and second pairs of hydraulic cylinder means when that one of said first and second pairs of hydraulic cylinder means orients its wheels in a forward direction during a transition from a turn in one direction to a turn in the opposite direction and until the other pair of wheels are also oriented in a forward direction, said flow control means being operative to return hydraulic fluid flow to the one of said first and second pairs of hydraulic cylinder means when both pair of wheels are oriented forwardly for continued transitional movement of all wheels to a turn in the opposite direction.

2. The vehicle set forth in claim 1 wherein the cylinder means of each pair are connected in parallel to define respective parallel-connected pairs, and the parallel-connected pairs are connected in series with the pressure source whereby one of said parallel-connected pairs receives hydraulic fluid directly from the source and the other of said parallel-connected pairs receives fluid expelled from the first of said parallel-connected pairs.

3. The vehicle set forth in claim 2 and including steering valve means for coupling the first pair of cylinder means directly to said pressure source for causing steering movement in one direction and the second pair of cylinder means to the pressure source for causing steering movement in the opposite direction.

4. The vehicle set forth in claim 3 wherein the flow control means includes first valve means coupled to one pair of cylinders and second valve means coupled to a second pair of cylinders, first and second sensing means coupled, respectively, to the front pair of wheels and the rear pair of wheels and each being operative for providing a signal when its associated wheels are oriented forwardly, said first valve means being responsive to the occurrence of the first signal to interrupt the flow of hydraulic fluid to the first pair of cylinders and said second valve means being responsive to the occurrence of the second signal to interrupt the flow of hydraulic fluid to the second pair of cylinders.

5. The vehicle set forth in claim 4 wherein each of said hydraulic cylinder means is double acting, and has first and second ends such that connecting the first end of the cylinder means to a pressure source will cause the wheel coupled thereto to be steered in a first direction and connecting the second end of the cylinder means to the pressure source will cause the wheel coupled thereto to be steered in the opposite direction.

6. The vehicle set forth in claim 1 wherein the flow control means includes first valve means coupled to one pair of cylinder means and second valve means coupled to the second pair of cylinder means, first and second sensing means coupled, respectively, to the front pair of wheels and the rear pair of wheels and each being operative for providing a signal when its associated wheels are oriented forwardly, said first valve means being responsive to the occurrence of the first signal to interrupt the flow of hydraulic fluid to the first pair of cylinder means and said second valve means being responsive to the occurrence of the second signal to interrupt the flow of hydraulic fluid to the second pair of cylinder means.

7. The vehicle set forth in claim 1 and including means for bypassing said second pair of cylinder means for two-wheel steering.

8. The vehicle set forth in claim 1 wherein each of said hydraulic cylinder means is double acting, and has first and second ends such that connecting a first end of the cylinder means to a pressure source will cause the wheel coupled thereto to be steered in a first direction and connecting the second end of the cylinder means to the pressure source will cause the wheel coupled thereto to be steered in the opposite direction.

9. A vehicle comprising a pair of front wheels and a pair of rear wheels, a hydraulic pressure source, first hydraulic means coupled to the front wheels and second hydraulic means coupled to the rear wheels, valve means for selectively coupling said first and second hydraulic means to the pressure source for simultaneously causing steering movement of the front wheels and the rear wheels whereby the vehicle may be turned in either a right-hand or a left-hand direction, and flow control means between said pressure source and said first and second hydraulic means for interrupting the flow of hydraulic fluid to one of said first and second hydraulic means when said one hydraulic means orients its wheels in a forward direction during a transition from a turn in one direction to a turn in the opposite direction and until the other pair of wheels are also oriented in a forward direction, said flow control means being operative to resume hydraulic fluid flow to the one hydraulic means when both pairs of wheels are oriented forwardly for continued transitional movement of all wheels to a turn in the opposite direction.

10. The vehicle set forth in claim 9 wherein the flow control means includes first valve means coupled to one of said hydraulic means and second valve means coupled to the other hydraulic means, first and second sensing means coupled, respectively, to the front pair of wheels and the rear pair of wheels and each being operative for providing a signal when its associated wheels are oriented forwardly, said flow control means being responsive to the occurrence of the first signal to actuate said first valve means to interrupt the flow of hydraulic fluid to the first hydraulic means and being responsive to the occurrence of the second signal to actuate said second valve means to interrupt the flow of hydraulic fluid to the second hydraulic means.

11. The vehicle set forth in claim 10 wherein said valve means includes steering valve means for coupling the first hydraulic means directly to the pressure source for causing steering movement in one direction and the second hydraulic means to the pressure source for causing steering movement in the opposite direction.

12. A vehicle comprising a pair of front wheels and a pair of rear wheels, first hydraulic means coupled to the front wheels and second hydraulic means coupled to the rear wheels, means for selectively coupling said first and second hydraulic means to the pressure source for simultaneously causing steering movement of the front wheels and the rear wheels whereby the vehicle may be turned in either a right-hand or a left-hand direction, and control means coupled to said first and second hydraulic means for arresting one of said first and second hydraulic means when said one hydraulic means orients its wheels in a forward direction during a transition from a turn in one direction to a turn in the opposite direction and until the other pair of wheels are also oriented in a forward direction, said control means being operative to resume the operation of the one hydraulic means when both pair of wheels are oriented forwardly for continued transitional movement of all wheels to a turn in the opposite direction.

* * * * *